United States Patent [19]

Graf et al.

[11] Patent Number: 5,454,113
[45] Date of Patent: Sep. 26, 1995

[54] CIRCUIT CONFIGURATION FOR PROTECTING THE OPERATION OF A COMPUTER-CONTROLLED APPARATUS

[75] Inventors: Friedrich Graf, Regensburg; Ernst Niedermeier; Klaus Staerker, both of Neutraubling; Jörg Flaig, Oberhaching, all of Germany

[73] Assignee: Siemens Aktiengesellschaft, Munich, Germany

[21] Appl. No.: 992,530

[22] Filed: Dec. 17, 1992

[30] Foreign Application Priority Data

Dec. 17, 1991 [EP] European Pat. Off. .............. 91121609

[51] Int. Cl.[6] .................. G06F 1/24; G06F 11/30
[52] U.S. Cl. .................. 395/750; 326/9; 395/185.01
[58] Field of Search ................... 395/750, 575, 395/725, 500, 800, 775; 371/12, 16.3, 25.1

[56] References Cited

U.S. PATENT DOCUMENTS

| | | | |
|---|---|---|---|
| 4,594,685 | 6/1986 | Owens | 395/575 |
| 4,696,002 | 9/1987 | Schleupen et al. | 371/12 |
| 4,794,558 | 12/1988 | Thompson | 395/800 |
| 4,956,807 | 9/1990 | Hosaka et al. | 395/575 |
| 5,012,435 | 4/1991 | Bailey et al. | 364/569 |
| 5,333,285 | 7/1994 | Drerup | 395/575 |

FOREIGN PATENT DOCUMENTS

| | | |
|---|---|---|
| 588899 | 9/1989 | Australia . |
| 0198170 | 10/1986 | European Pat. Off. . |

OTHER PUBLICATIONS

Publication: Electronic Design 2, Jan. 18, 1977, pp. 90 and 92.

Primary Examiner—Jack B. Harvey
Assistant Examiner—Glenn A. Auve
Attorney, Agent, or Firm—Herbert L. Lerner; Laurence A. Greenberg

[57] ABSTRACT

A control unit is controlled by a computer having a reset input. A circuit configuration protects the operation of the control unit by placing a signal at the reset input for restarting the computer in the event of a malfunction. The circuit configuration includes a first register into which a predetermined bit pattern is written in read-only fashion; a second check register in which a single defined bit is set at a time after individual program routines have been executed; a counter timer; and a comparator connected to the first register, to the second check register and to the counter timer, for comparing contents of the second check register with contents of the first register and outputting a reload signal for reloading the counter timer if the contents match.

7 Claims, 4 Drawing Sheets

CIRCUIT CONFIGURATION FOR PROTECTING THE OPERATION OF A COMPUTER-CONTROLLED APPARATUS

BACKGROUND OF THE INVENTION

1. Field of the Invention

The invention relates to a circuit configuration for protecting the operation of a computer-controlled control unit, by means of which a signal is placed at the reset input of the computer and as a result the computer is restarted, in the event of a malfunction. Such circuit configurations are important, for instance, for monitoring motor vehicle control units where reliable operation is indispensable, such as in transmission, engine, injection and ignition controls.

2. Description of the Related Art

Many versions of monitoring and reset circuits for microcomputers are known, such as from the publication Electronic Design 2, Jan. 18, 1977, pages 90 and 92; and German Published, Non-Prosecuted Application DE 34 21 584 A1, corresponding to U.S. Pat. No. 4,696,002. A microcomputer or microcontroller is monitored for correct program execution by an additional component, which is sometimes called a watchdog. The microcomputer must furnish defined signal pulses to the watchdog. An absence of the pulses or a deviation from the defined course makes the watchdog circuit send an electrical reset signal to the microcomputer, causing the latter to jump to a defined address in its program memory and begin again to execute routines. That prevents the control unit from outputting uncontrolled signals in the event of errors in executing the control unit program. The routine for generating the signal pulses is configured in such a way that the pulses are fed to the watchdog only if program execution is perfect. Such a monitoring has the disadvantage of requiring an additional external component. Moreover, it cannot be entirely precluded that the aforementioned routine will continue to generate signal pulses even if program execution is defective.

The monitoring circuit can also be disposed on the same chip as the microprocessor, in which case it is known as an on-chip watchdog that has to be turned on first by the control unit program. That means that errors in which the control unit program does not even run, cannot be eliminated. That is disadvantageous especially if the monitoring circuit is intended not only to trip a computer reset but also to influence the controlled equipment, such as the actuators or final control elements in a transmission control system, in such a way that the equipment assumes a passive state for safety reasons.

It is accordingly an object of the invention to provide a circuit configuration for protecting the operation of a computer-controlled apparatus, which overcomes the hereinafore-mentioned disadvantages of the heretofore-known devices of this general type and which assures the greatest possible safety in the operation of a computer-controlled control unit.

SUMMARY OF THE INVENTION

With the foregoing and other objects in view there is provided, in accordance with the invention, in a control unit being controlled by a computer having a reset input, a circuit configuration for protecting the operation of the control unit by placing a signal at the reset input for restarting the computer in the event of a malfunction, comprising a first register into which a predetermined bit pattern is written in read-only fashion; a second check register in which a single defined bit is set at a time after individual program routines have been executed; a counter timer; and a comparator connected to the first register, to the second check register and to the counter timer, for comparing contents of the second check register with contents of the first register and outputting a reload signal for reloading the counter timer if the contents coincide or correspond.

In accordance with another feature of the invention, there are provided means for allowing writing into the second check register only in increasing order.

In accordance with a further feature of the invention, the first register is written into by the computer and has contents that are loaded into the counter timer.

In accordance with an added feature of the invention, the counter timer is a downward counter for outputting a reset signal when a value 0 is attained.

In accordance with an additional feature of the invention, there is provided a reset circuit having a first input receiving an external reset signal, a second input receiving the reset signal of the counter timer, and a third input receiving the reload signal.

In accordance with yet another feature of the invention, the reset circuit has a first output from which a reset signal is fed to the computer when one of the reset signals is present at one of the first and second inputs of the reset circuit, and the reset circuit has a second output for supplying a blocking signal for putting an apparatus into a safe state.

In accordance with yet a further feature of the invention, the reset circuit has an output for supplying an enable signal enabling the control unit to control an apparatus, when the reload signal is present at the third input of the reset circuit.

In accordance with yet an added feature of the invention, there is provided an instruction counter for counting instructions executed by a central processing unit of the computer and disabling further writing into the first register upon attainment of a predetermined number of instructions.

In accordance with a concomitant feature of the invention, there are provided means for causing the bits in the second check register not being set at a given time to assume a value being inverse to the bit to be set.

Among others, the advantages of the circuit configuration according to the invention are that with it program diagnosis can be carried out even in the event of an error.

Other features which are considered as characteristic for the invention are set forth in the appended claims.

Although the invention is illustrated and described herein as embodied in a circuit configuration for protecting the operation of a computer-controlled apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
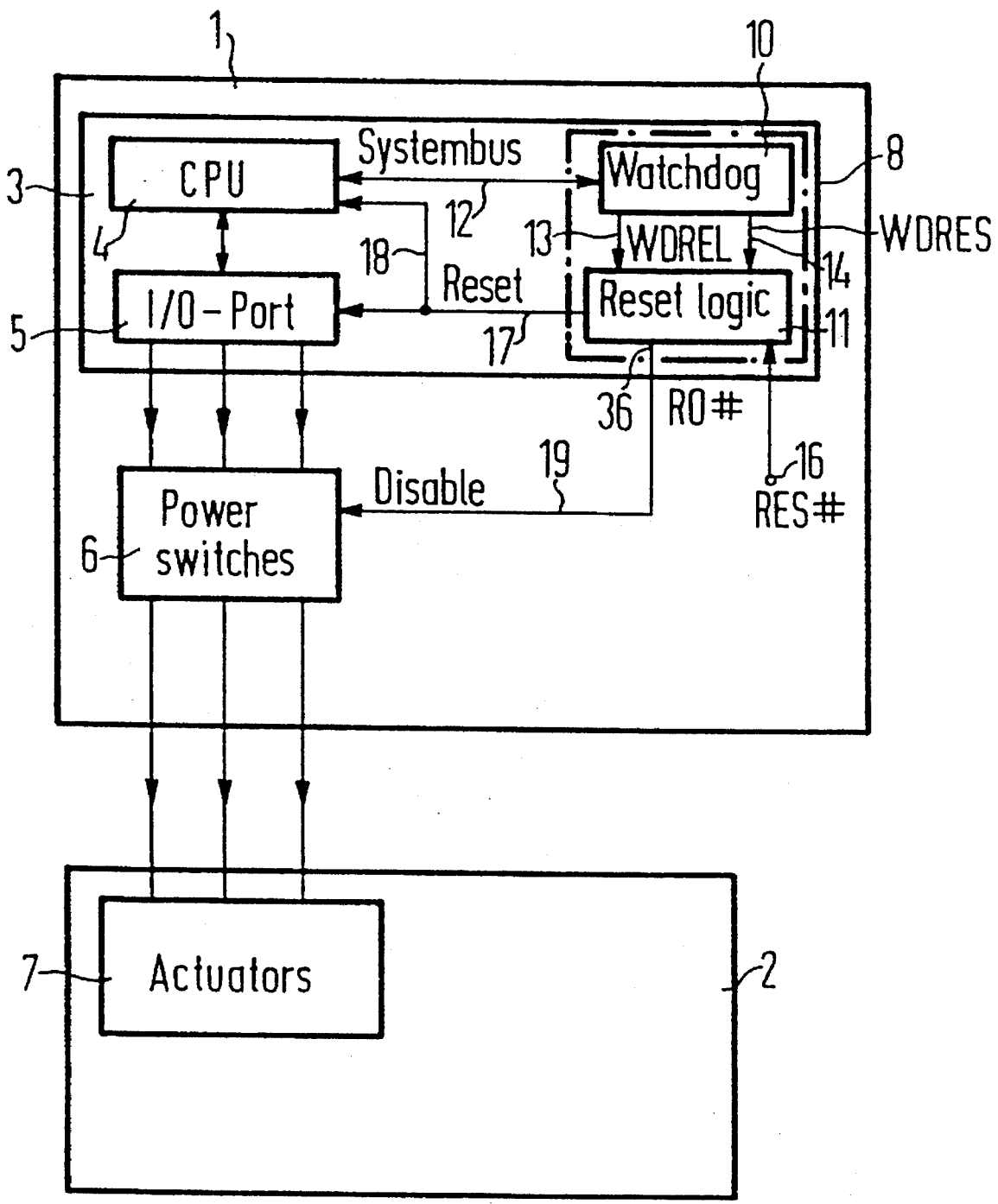
FIG. 1 is a block circuit diagram of a circuit configuration according to the invention.

Referring now to the figures of the drawing in detail and first, particularly, to FIG. 1 thereof, there is seen a computer-controlled control unit 1 which serves to control an apparatus 2 that is referred to below as the controlled apparatus. By way of example, it is an electronic transmission control system that controls an automatic motor vehicle transmission. The control unit 1 includes a microcomputer or microcontroller 3, which substantially includes a central processing unit or CPU 4, memories that are not shown individually, and input and output ports 5. Power switches 6 are controlled through these ports 5, and they in turn switch actuators 7 in the controlled apparatus 2.

A monitoring and protection circuit 8, which is disposed on the same chip as the microcomputer 3, includes a monitoring circuit 10 that is also referred to below as a watchdog, and a reset circuit 11 that is also referred to below as a reset logic. The watchdog 10 is connected to the central processing unit 4 by a system bus 12 and to second and third inputs of the reset logic 11 by two respective signal lines 14 and 13. A first input of the reset logic 11 is connected to a reset pin or terminal 16 of the circuit configuration or control unit 1.

A reset or first output of the reset logic 11 is connected by signal lines 17 and 18 to a control input of the input and output ports 5 and to a reset input of the central processing unit 4. A further or second output of the reset logic 11, which represents a pin 36 of the microcomputer 3 at which a blocking signal RO# is output, is connected by an output line 19 to a blocking or disable input of the power switches 6.

Figure 2:
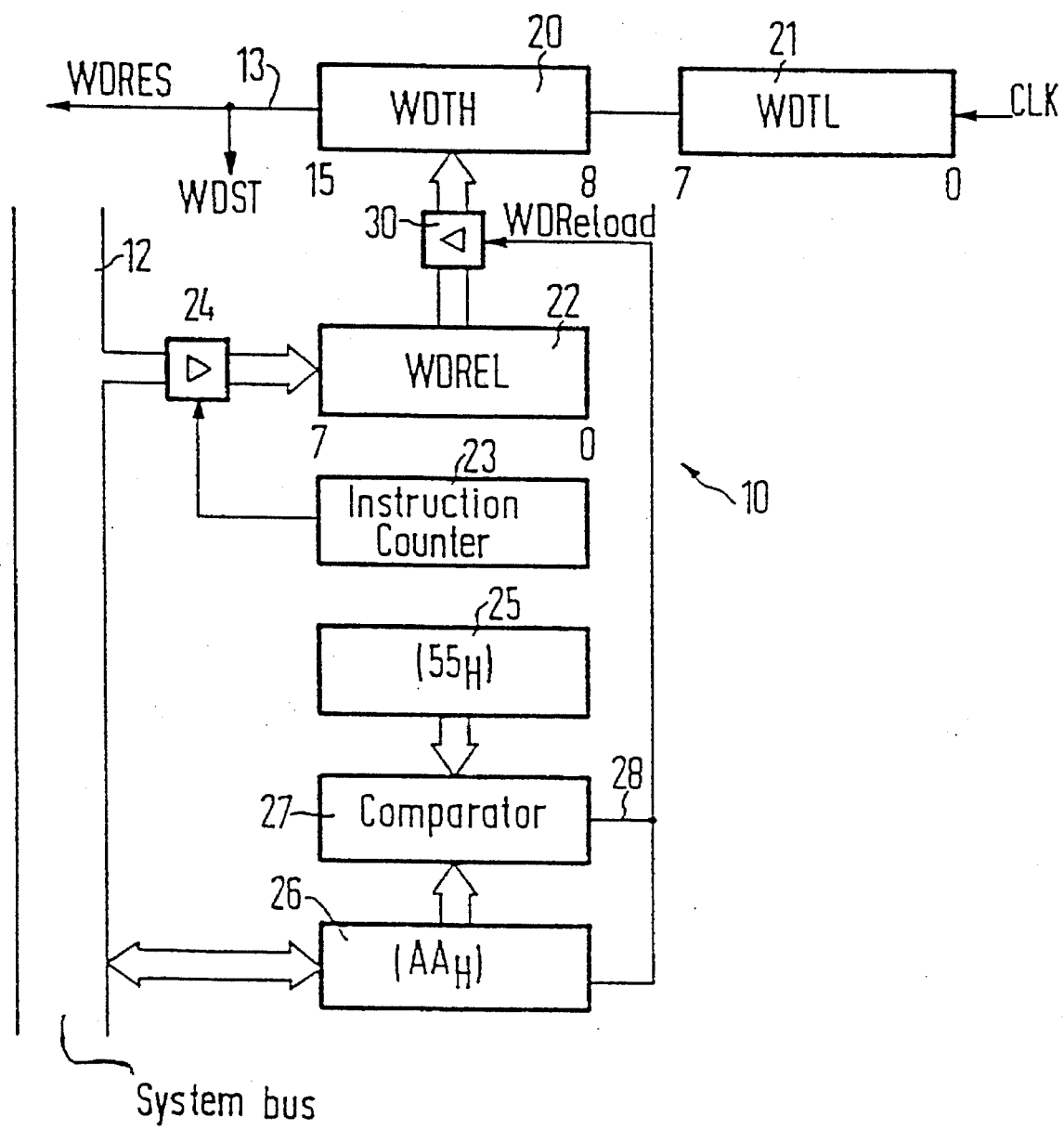
FIG. 2 is a diagram of a monitoring circuit of the circuit configuration of FIG. 1.

The watchdog circuit 10 shown in FIG. 2 has a timer that includes a writable preselect counter timer 20 and a preceding counter 21, both of which are constructed as downward counters. The counter 21, which is an eight-bit-wide counter, lowers a clock signal CLK present at its input by a factor of 256 and feeds it to an input of the counter timer 20. That counter counts downward from a value written into it and when a value of 0 is reached, it outputs a reset signal WDRES (watchdog reset) at its output over the line 13. The central processing unit 4 of the microcomputer 3 loads a first register 22 through the system bus 12, with a reload value WDREL, which corresponds to a defined period of time after which the counter timer 20 runs out.

The reload value WDREL must be written in within a predetermined number of instructions after a system reset (signal RESET). The number of instructions is counted by an instruction counter 23, which is connected to a switch 24. If the reload value WDREL is not loaded punctually, a system reset occurs. In other words, the microcomputer is reset, and the power switch and/or the I/O ports 5 are inactivated.

After a system reset, the watchdog circuit is reactivated automatically and runs down again after the defined period of time, unless the reload value WDREL is written into the register 22 by the central processing unit CPU within the predetermined number of instructions.

A register 25 that is constructed as a read-only memory includes a fixed value, such as the hexadecimal number $55_H$. A second check register 26 is programmable in single-bit fashion by the customer. After a system reset and upon each watchdog reload, the check register 26 has the complement of the comparison value, which in this example is the number $AA_H$, preallocated to it. A comparator 27 compares the contents of the register 25 with the contents of the check register 26.

In the check register 26, after the various program routines have been executed in the microcomputer 3, bits are set or reset by program, which is specifically a defined bit after each routine. The bits in the check register 26 that are not served each have to be the inverse of the bit to be written. The check register may be written exclusively in increasing order. If this order is not adhered to, then the applicable bit remains unaltered. If the bit pattern in the check register 26 has changed so much that it is identical to the value stored in read-only fashion in the register 25, after the routines have been executed, then the watchdog circuit 10 is refreshed upon writing the last bit of the check register 26. This is done in such a way that the comparator 27 outputs an output signal WDReload over a line 28. On one hand, this signal causes a switch 30 to be connected through so that the contents WDREL of the register 22 are loaded into the counter timer 20, and on the other hand it causes the control register 26 to have the complement of the comparison value, in this example the value $AA_H$, preallocated to it.

If individual program routines are not executed, then the bit pattern in the check register 26 will not match the comparison value in the register 25. The watchdog timer 20, 21 is not reloaded and therefore runs out and generates the watchdog reset WDRES, sets a watchdog status flag WDST, and activates the output 19 of the microcomputer 3, whereupon it outputs the blocking or disable signal RO# seen in FIG. 3. The check register 26 is not affected by the watchdog reset, so that it can be subsequently evaluated by program, and program routines that are not executed can be ascertained in the process. Accordingly, the watchdog circuit 10 affords the capability of monitoring the various program routines, or in other words carrying out a program diagnosis.

Figure 3:
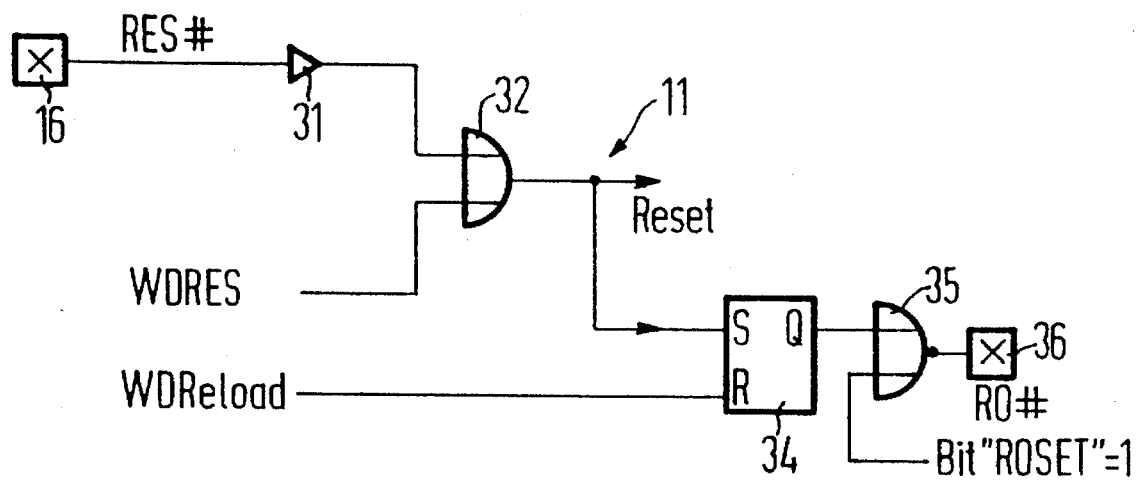
FIG. 3 is a schematic circuit diagram of a reset circuit of the circuit configuration of FIG. 1.

The linkage and evaluation of the aforementioned signals is performed in the reset circuit 11 shown in FIG. 3. The reset signal RES# (being active in the "load" state) that is present at the reset pin 16, passes through an inverter 31 to reach one input of an OR element 32. The watchdog reset signal WDRES is placed at its other input. The signal Reset (system RESET) that resets the microcomputer 3 is output by an output of the OR element 32.

The signal Reset also reaches an S input of a flip-flop 34, having an R input at which the signal WDReload is placed. A Q output of the flip-flop 34 is connected to one input of a NOR element 35. A flag bit ROSET is placed at the other input of this element 35. By setting the flag bit ROSET=1, the reset output of the microcomputer 3 is set to 0 (or "low") by the control unit program. It is thus also possible to feed the blocking signal RO# from the control unit to the line and thus to block the actuators connected to it. The output of the NOR element 35 is connected to the pin 36, which represents the reset output of the microcomputer 3, to which the output line 19 is connected and at which the signal RO# is output. The reset signal RES# (in the "low" state) or the watchdog reset signal WDRES (in the "high" state) thus act as reset sources and through the OR element 32, they furnish the signal Reset by which the microcomputer 3 is reset. In addition, by means of the disable signal RO# (low state), the input/output ports 5 and/or the power switches 6 are disabled, and thus the apparatus 2 to be controlled is put into a safe state.

The signal RO# then returns to the "high state" only once all of the program routines have been executed and thus the check bits in the check register 26 have been set, and indeed have been set in the correct order. This change in state takes place upon the reload signal WDReload.

Figure 4:
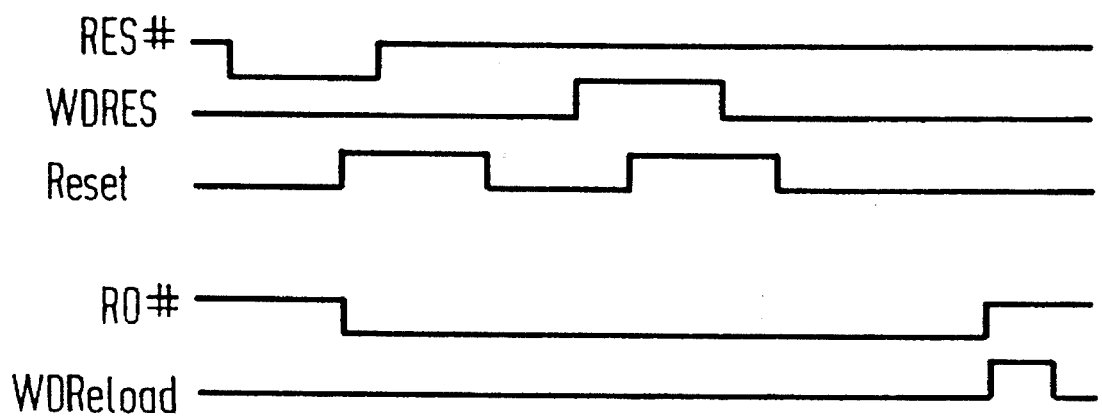
FIG. 4 is a graph showing the course over time of a plurality of signals of the circuit of FIG. 3.

FIG. 4 shows the course over time of the control signals that have been mentioned above in the description of the circuit configurations according to the invention. Specifically, from top to bottom they are: the reset signal RES#, the watchdog reset signal WDRES, the system reset signal Reset, the disable or blocking signal RO#, and the watchdog reload signal WDReload.

Figure 5:
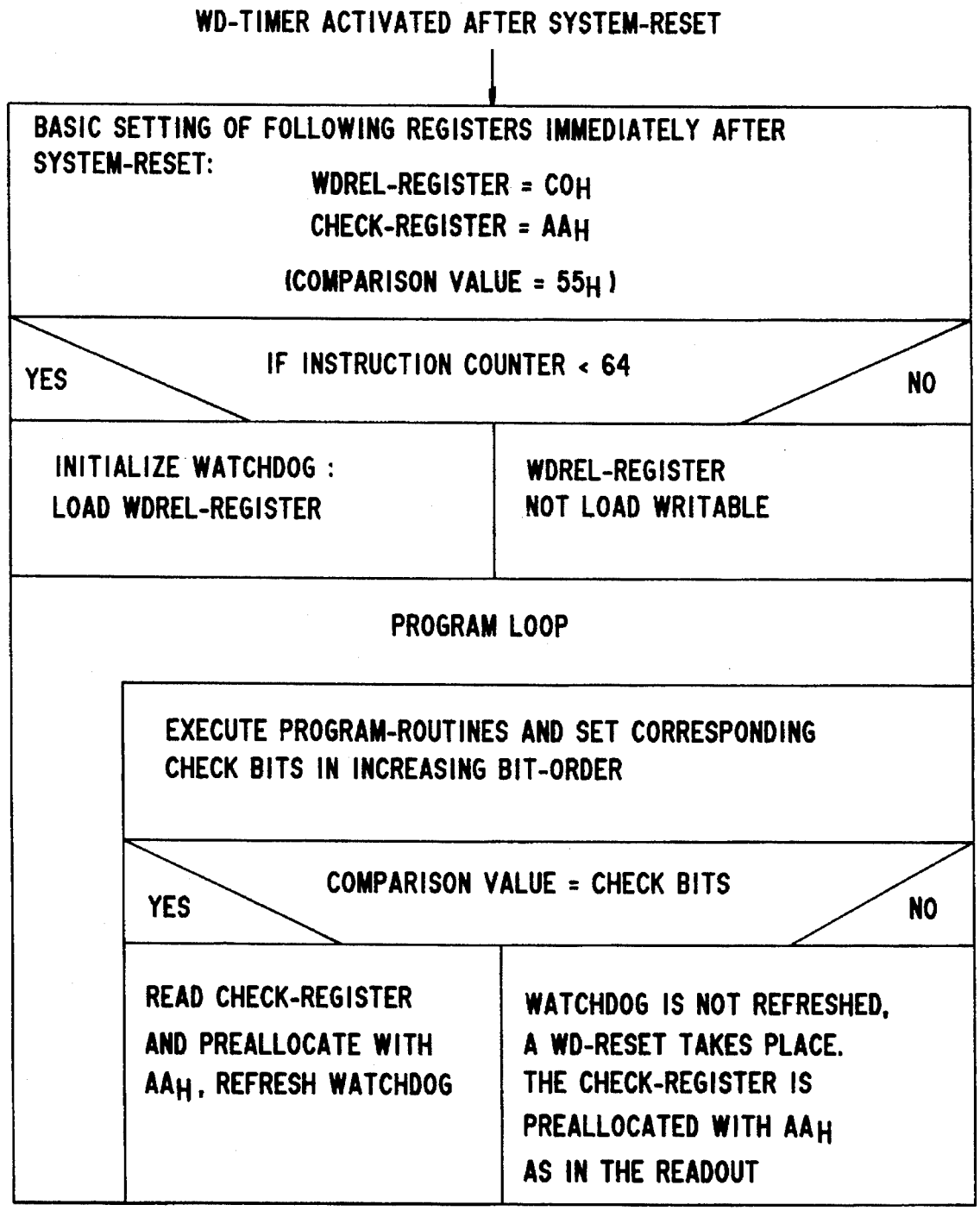
FIG. 5 is a flowchart that is used to explain the function of the circuit configuration of FIG. 1.

The mode of operation of the circuit configuration according to the invention, which has been explained above, is shown in a coherent overview in the flowchart that can be seen in FIG. 5.

We claim:

1. In a control unit being controlled by a computer having a reset input, a circuit configuration for protecting the operation of the control unit by placing a signal at the reset input for restarting the computer in the event of a malfunction, the circuit configuration comprising:

a first register in the form of a read-only memory storing a predetermined bit pattern;

a check register in which a single defined bit is set at a time after individual program routines have been executed;

a counter timer;

a comparator connected to said first register, to said check register and to said counter timer, for comparing contents of said check register with contents of said first register and outputting a reload signal for reloading said counter timer if the contents match; and means for allowing writing into said check register only in increasing order.

2. In a control unit being controlled by a computer having a reset input, a circuit configuration for protecting the operation of the control unit by placing a signal at the reset input for restarting the computer in the event of a malfunction, the circuit configuration comprising:

a first register in the form of a read-only memory storing a predetermined bit pattern;

a check register in which a single defined bit is set at a time after individual program routines have been executed;

a counter timer;

a comparator connected to said first register, to said check register and to said counter timer, for comparing contents of said check register with contents of said first register and outputting a reload signal for reloading said counter timer if the contents match, wherein a second register is written into by the computer and has contents that are loaded into said counter timer.

3. The circuit configuration according to claim 2, wherein said counter timer is a downward counter for outputting a reset signal when a value 0 is attained.

4. The circuit configuration according to claim 3, including a reset circuit having a first input receiving an external reset signal, a second input receiving the reset signal of said counter timer, and a third input receiving the reload signal.

5. The circuit configuration according to claim 4, wherein the computer is connected to and controls an apparatus through a plurality of power switches, said reset circuit has a first output from which a reset signal is fed to the computer when one of the reset signals is present at one of the first and second inputs of said reset circuit, and said reset circuit has a second output for supplying a blocking signal to the power switches for putting the apparatus into a safe state.

6. The circuit configuration according to claim 4, wherein said reset circuit has an output for supplying an enable signal enabling the control unit to control an apparatus when the reload signal is present at the third input of said reset circuit.

7. In a control unit being controlled by a computer having a reset input, a circuit configuration for protecting the operation of the control unit by placing a signal at the reset input for restarting the computer in the event of a malfunction, the circuit configuration comprising:

a first register in the form of a read-only memory storing a predetermined bit pattern;

a check register in which a single defined bit is set at a time after individual program routines have been executed;

a counter timer;

a comparator connected to said first register, to said check register and to said counter timer, for comparing contents of said check register with contents of said first register and outputting a reload signal for reloading said counter timer if the contents match, including an instruction counter for counting instructions executed by a central processing unit of the computer and disabling further writing into said check register after the central processing unit has processed a predetermined number of instructions.

* * * * *